United States Patent
Lee et al.

(10) Patent No.: US 10,392,093 B2
(45) Date of Patent: Aug. 27, 2019

(54) SHIP COMPRISING ENGINE (71) Applicant: DAEWOO SHIPBUILDING & MARINE ENGINEERING CO., LTD., Seoul (KR)

(72) Inventors: Joon Chae Lee, Seoul (KR); Hae Won Jung, Seoul (KR)

(73) Assignee: Daewoo Shipbuilding & Marine Engineering Co., Ltd., Seoul (KR)

( * ) Notice: Subject to any disclaimer, the term of this patent is extended or adjusted under 35 U.S.C. 154(b) by 0 days.

(21) Appl. No.: 15/742,840

(22) PCT Filed: Jun. 29, 2016

(86) PCT No.: PCT/KR2016/006974
§ 371 (c)(1),
(2) Date: Jan. 8, 2018

(87) PCT Pub. No.: WO2017/007168
PCT Pub. Date: Jan. 12, 2017

(65) Prior Publication Data
US 2018/0201353 A1 Jul. 19, 2018

(30) Foreign Application Priority Data
Jul. 8, 2015 (KR) .......................... 10-2015-009737

(51) Int. Cl.
*B63H 21/38* (2006.01)
*B63B 25/16* (2006.01)
(Continued)

(52) U.S. Cl.
CPC ......... *B63H 21/38* (2013.01); *B63B 17/0027* (2013.01); *B63B 25/16* (2013.01);
(Continued)

(58) Field of Classification Search
CPC ..... B63H 21/38; B63B 17/00; B63B 17/0027; B63B 25/08; B63B 25/16; F02M 21/0287;
(Continued)

(56) References Cited

U.S. PATENT DOCUMENTS 3,857,245 A    12/1974  Jones
2014/0290279 A1  10/2014  Lee et al.
(Continued)

FOREIGN PATENT DOCUMENTS

EP      2853479 A1    4/2015
JP    2009-191945 A    8/2009
(Continued)

OTHER PUBLICATIONS

International Search Report dated Sep. 27, 2016 of PCT/KR2016/006974 which is the parent application and its English translation in 6 pages.
(Continued)

*Primary Examiner* — Lars A Olson
(74) *Attorney, Agent, or Firm* — Knobbe Martens Olson & Bear LLP (57) ABSTRACT

A ship comprises an engine; a first self-heat exchanger which heat-exchanges boil-off gas discharged from a storage tank; a multi-stage compressor which compresses, in multi-stages, the boil-off gas that passed through the first self-heat exchanger after being discharged from the storage tank; a first decompressing device which expands one portion of the boil-off gas compressed by the multi-stage compressor; a second self-heat exchanger which heat-exchanges the other portion of the boil-off gas compressed by the multi-stage compressor, with the boil-off gas expanded by the first decompressing device; and a second decompressing device which expands the boil-off gas pre-cooled by the second
(Continued)

self-heat exchanger and cooled by the first self-heat exchanger, wherein the first self-heat exchanger uses the boil-off gas discharged from the storage tank as a refrigerant for cooling the boil-off gas that passed through the second self-heat exchanger after being compressed by the multi-stage compressor.

18 Claims, 5 Drawing Sheets

(51) Int. Cl.
    *F17C 5/02*     (2006.01)
    *F17C 7/04*     (2006.01)
    *B63B 17/00*     (2006.01)
    *F02M 21/02*     (2006.01)
    *F17C 9/02*     (2006.01)

(52) U.S. Cl.
    CPC .... *F02M 21/0209* (2013.01); *F02M 21/0215* (2013.01); *F02M 21/0218* (2013.01); *F02M 21/0221* (2013.01); *F02M 21/0287* (2013.01); *F17C 5/02* (2013.01); *F17C 7/04* (2013.01); *F17C 9/02* (2013.01); *B63B 2770/00* (2013.01); *F17C 2221/033* (2013.01); *F17C 2223/0161* (2013.01); *F17C 2223/033* (2013.01); *F17C 2223/043* (2013.01); *F17C 2260/035* (2013.01); *F17C 2265/033* (2013.01); *F17C 2265/036* (2013.01); *F17C 2265/037* (2013.01); *F17C 2265/038* (2013.01); *F17C 2265/066* (2013.01); *F17C 2265/07* (2013.01); *F17C 2270/0105* (2013.01); *Y02T 10/32* (2013.01)

(58) Field of Classification Search
CPC .. F02M 21/0212; F02M 21/0215; F17C 7/02; F17C 7/04
USPC .......................................................... 440/88 F
See application file for complete search history.

(56) References Cited

U.S. PATENT DOCUMENTS

| | | | | |
|---|---|---|---|---|
| 2014/0352330 | A1* | 12/2014 | Baek | F17C 7/04 62/48.1 |
| 2018/0194447 | A1* | 7/2018 | Lee | B63B 25/16 |
| 2018/0363975 | A1* | 12/2018 | Jung | B63B 25/14 |
| 2019/0041125 | A1* | 2/2019 | Jung | B63B 25/16 |

FOREIGN PATENT DOCUMENTS

| | | |
|---|---|---|
| KR | 10-2012-0049731 A | 5/2012 |
| KR | 10-2014-0052896 A | 5/2014 |
| KR | 10-1441243 B1 | 9/2014 |
| KR | 10-2015-0039427 A | 4/2015 |
| KR | 10-1511214 B1 | 4/2015 |

OTHER PUBLICATIONS

Extended European Search Report of corresponding Patent Application No. 16821574.7—6 pages (dated Dec. 21, 2018).

Office Action of corresponding Singaporean Patent Application No. 11201800168W—10 pages (dated Oct. 1, 2018).

"ME-GI Dual Fuel Man B&W Engines: A Technical, Operational and Cost-effective Solution for Ships Fulled by Gas", MAN Diesel & Turbo—32 pages (Dec. 18, 2014).

\* cited by examiner

SHIP COMPRISING ENGINE

TECHNICAL FIELD

The present invention relates to a ship including an engine and, more particularly, to a ship including an engine, in which boil-off gas (BOG) remaining after being used as fuel in the engine is reliquefied into liquefied natural gas using boil-off gas as a refrigerant and is returned to a storage tank.

BACKGROUND ART

Generally, natural gas is liquefied and transported over a long distance in the form of liquefied natural gas (LNG). Liquefied natural gas is obtained by cooling natural gas to a very low temperature of about −163° C. at atmospheric pressure and is well suited to long-distance transportation by sea, since the volume thereof is significantly reduced, as compared with natural gas in a gas phase.

Even when an LNG storage tank is insulated, there is a limit to completely blocking external heat. Thus, LNG is continuously vaporized in the LNG storage tank by heat transferred into the storage tank. LNG vaporized in the storage tank is referred to as boil-off gas (BOG).

If the pressure in the storage tank exceeds a predetermined safe pressure due to generation of boil-off gas, the boil-off gas is discharged from the storage tank through a safety valve. The boil-off gas discharged from the storage tank is used as fuel for a ship, or is reliquefied and returned to the storage tank.

Examples of a marine engine capable of being fueled by natural gas include a dual fuel (DF) engine and an ME-GI engine.

A DFDE engine has four strokes per cycle and uses the Otto cycle in which natural gas having a relatively low pressure of about 6.5 bar is injected into a combustion air inlet, followed by pushing a piston upward to compress the gas.

An ME-GI engine has two strokes per cycle and uses a diesel cycle in which natural gas having a high-pressure of about 300 bar is injected directly into a combustion chamber in the vicinity of the top dead center of a piston. Recently, the ME-GI engine has attracted attention due to better fuel efficiency and propulsion efficiency thereof.

DISCLOSURE

Technical Problem

Typically, a BOG reliquefaction system employs a cooling cycle for reliquefaction of BOG through cooling. Cooling of BOG is performed through heat exchange with a refrigerant and a partial reliquefaction system (PRS) using BOG itself as a refrigerant is used in the art.

Figure 1:
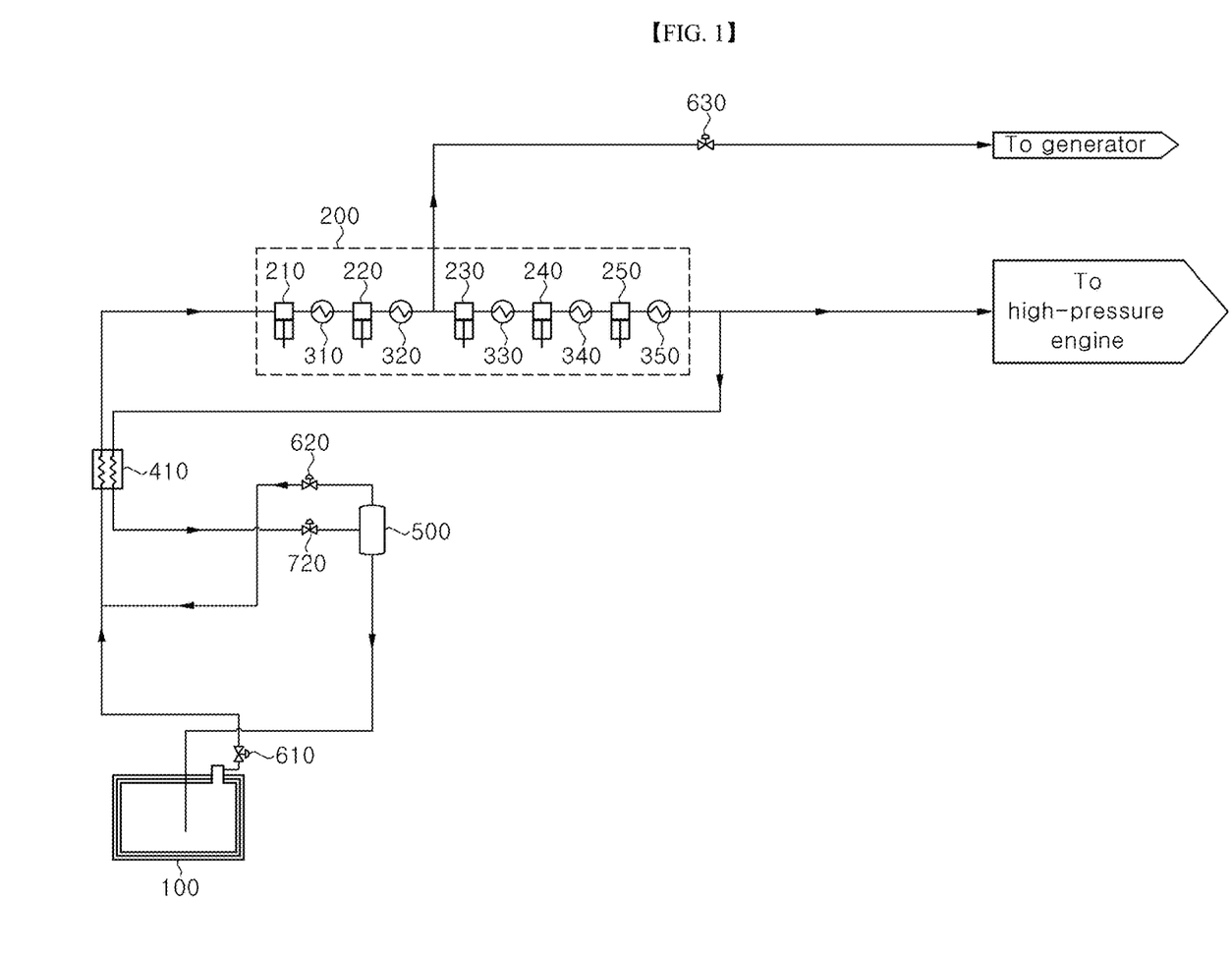
FIG. 1 is a schematic diagram of a partial reliquefaction system applied to a ship including a high-pressure engine in the related art.

FIG. 1 is a schematic diagram of a partial reliquefaction system applied to a ship including a high-pressure engine in the related art.

Referring to FIG. 1, in a partial reliquefaction system applied to a ship including a high-pressure engine in the related art, BOG discharged from a storage tank 100 is sent to a first self-heat exchanger 410 via a first valve 610. The BOG discharged from the storage tank 100 and subjected to heat exchange with a refrigerant in the first self-heat exchanger 410 is subjected to multiple stages of compression by a multistage compressor 200, which includes a plurality of compression cylinders 210, 220, 230, 240, 250 and a plurality of coolers 310, 320, 330, 340, 350. Then, some BOG is sent to a high-pressure engine to be used as fuel and the remaining BOG is sent to the first self-heat exchanger 410 to be cooled through heat exchange with BOG discharged from the storage tank 100.

The BOG cooled by the first self-heat exchanger 410 after multistage compression is partially reliquefied by a decompressor 720 and is separated into liquefied natural gas generated through reliquefaction and gaseous BOG by a gas/liquid separator 500. The reliquefied natural gas separated by the gas/liquid separator 500 is sent to the storage tank 100, and the gaseous BOG separated by the gas/liquid separator 500 is joined with BOG discharged from the storage tank 100 after passing through a second valve 620 and is then sent to the first self-heat exchanger 410.

On the other hand, some of the BOG discharged from the storage tank 100 and having passed through the first self-heat exchanger 410 is subjected to a partial compression process among multiple stages of compression (for example, passes through two compression cylinders 210, 220 and two coolers 310, 320 among five compression cylinders 210, 220, 230, 240, 250 and five coolers 310, 320, 330, 340, 350), divided to a third valve 630, and finally sent to a generator. Since the generator requires natural gas having a lower pressure than pressure required for the high-pressure engine, the BOG subjected to the partial compression process is supplied to the generator.

Figure 2:
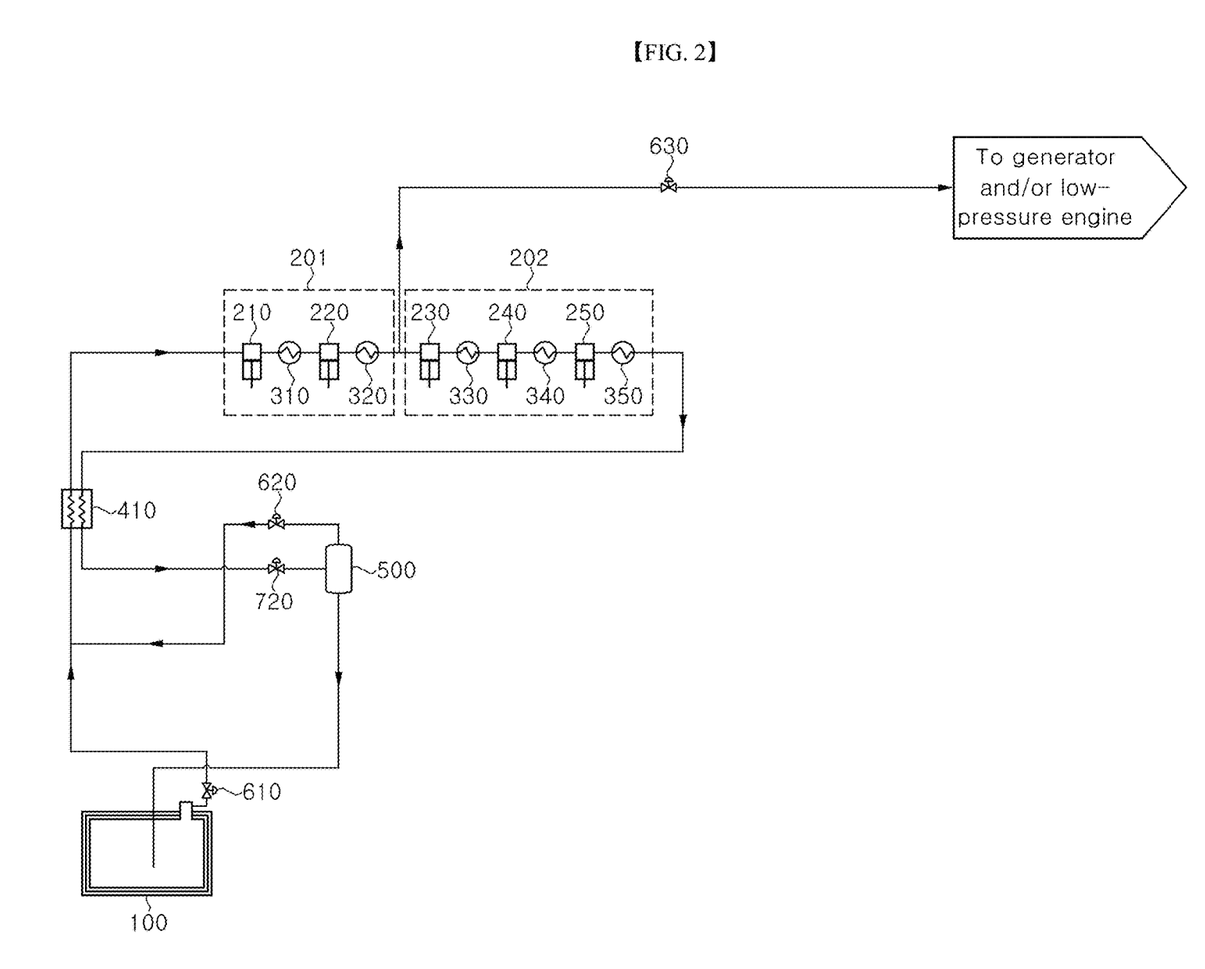
FIG. 2 is a schematic diagram of a partial reliquefaction system applied to a ship including a low-pressure engine in the related art.

FIG. 2 is a schematic diagram of a partial reliquefaction system applied to a ship including a high-pressure engine in the related art.

Referring to FIG. 2, as in the partial reliquefaction system applied to a ship including a high-pressure engine, in a partial reliquefaction system applied to a ship including a low-pressure engine in the related art, BOG discharged from a storage tank 100 is sent to a first self-heat exchanger 410 via a first valve 610. As in the partial reliquefaction system shown in FIG. 1, the BOG having been discharged from the storage tank 100 and passed through the first self-heat exchanger 410 is subjected to multiple stages of compression by a multistage compressor 201, 202 and is then sent to the first self-heat exchanger 410 to be cooled through heat exchange with BOG discharged from the storage tank 100.

As in the partial reliquefaction system shown in FIG. 1, the BOG cooled by the first self-heat exchanger 410 after multistage compression is partially reliquefied by a decompressor 720 and is separated into liquefied natural gas generated through reliquefaction and gaseous BOG by a gas/liquid separator 500. The reliquefied natural gas separated by the gas/liquid separator 500 is sent to the storage tank 100, and the gaseous BOG separated by the gas/liquid separator 500 is joined with BOG discharged from the storage tank 100 after passing through a second valve 620 and is then sent to the first self-heat exchanger 410.

Here, unlike the partial reliquefaction system shown in FIG. 1, in the partial reliquefaction system applied to a ship including a low-pressure engine in the related art, the BOG subjected to the partial compression process among the multiple stages of compression is divided and sent to the generator and/or the engine and all of the BOG subjected to all of the multiple stages of compression is sent to the first self-heat exchanger 410. Since low-pressure engine requires natural gas having a similar pressure to pressure required for the generator, the BOG subjected to the partial compression process is supplied to the low-pressure engine and the generator.

In the partial reliquefaction system applied to the ship including a high-pressure engine in the related art, since some of the BOG subjected to all of the multiple stages of compression is sent to the high-pressure engine, a single multistage compressor 200 having capacity required for the high-pressure engine is installed.

However, in the partial reliquefaction system applied to the ship including a low-pressure engine in the related art, since the BOG subjected to the partial compression process among the multiple stages of compression is sent to the generator and/or the engine and the BOG subjected to all of the multiple stages of compression is not sent to the engine, none of the compression stages require a large capacity compression cylinder.

Accordingly, some of BOG compressed by a first multistage compressor 201 having a relatively large capacity is divided and sent to the generator and the engine, and the remaining BOG is additionally compressed by a second multistage compressor 201 having a relatively small capacity and sent to the first self-heat exchanger 410.

In the partial reliquefaction system applied to the ship including a low-pressure engine in the related art, the capacity of the compressor is optimized depending upon the degree of compression required for the generator or the engine in order to prevent increase in manufacturing cost associated with the capacity of the compressor, and installation of two multistage compressors 201, 202 provides a drawback of troublesome maintenance and overhaul.

Embodiments of the present invention a ship comprising an engine, which performs precooling with respect to BOG subjected to multistage compression through heat exchange with BOG having low pressure and low temperature before the BOG subjected to multistage compression is sent to the first self-heat exchanger 410, based on the fact that some BOG having a relatively low pressure is divided and sent to the generator (to the generator and/or the engine in the case of a low-pressure engine).

Technical Solution

In accordance with one aspect of the present invention, there is provided a ship comprising an engine, further comprising: a first self-heat exchanger performing heat exchange with respect to boil-off gas (BOG) discharged from a storage tank; a multistage compressor compressing the BOG discharged from the storage tank and having passed through the first self-heat exchanger in multiple stages; a first decompressor expanding some of the BOG compressed by the multistage compressor; a second self-heat exchanger performing heat exchange with respect to the other BOG compressed by the multistage compressor with the BOG expanded by the first decompressor; and a second decompressor expanding the BOG precooled by the second self-heat exchanger and cooled by the first self-heat exchanger, wherein the first self-heat exchanger cools the BOG compressed by the multistage compressor and having passed through the second self-heat exchanger using the BOG discharged from the storage tank.

The BOG having passed through the second decompressor and having a gas/liquid mixed phase may be sent to the storage tank.

The ship may further include a liquid/gas separator disposed downstream of the second decompressor and separating liquefied natural gas generated through reliquefaction of the BOG and gaseous BOG from each other, wherein the liquefied natural gas separated by the gas/liquid separator is sent to the storage tank and the gaseous BOG separated by the gas/liquid separator is sent to the first self-heat exchanger.

Some of the BOG having passed through the multistage compressor may be sent to a high-pressure engine.

The high-pressure engine may be an ME-GI engine.

The high-pressure engine may use natural gas at a pressure of about 150 to 400 bar as fuel.

The BOG having passed through the first decompressor and the second self-heat exchanger may be sent to a generator.

The BOG having passed through the first decompressor and the second self-heat exchanger may be sent to a low-pressure engine.

The BOG having passed through the first decompressor and the second self-heat exchanger may be sent to a generator and a low-pressure engine.

The low-pressure engine may be at least one of a DF engine, an X-DF engine and a gas turbine.

The low-pressure engine may use natural gas at a pressure of about 6 to 20 bar as fuel.

The low-pressure engine may use natural gas at a pressure of 55 bar as fuel.

The generator may use natural gas at a pressure of about 6 to 10 bar as fuel.

The multistage compressor may include a plurality of compression cylinders compressing BOG; and a plurality of coolers disposed downstream of the plurality of compression cylinders, respectively, and cooling the BOG compressed by the compression cylinders and having increased pressure and temperature.

The multistage compressor may compress the BOG to a critical pressure or more.

The multistage compressor may compress the BOG to a pressure of about 100 bar or more.

The ship may further include a valve controlling a flow amount of the gaseous BOG separated by the gas/liquid separator and sent to the first self-heat exchanger.

The ship may further include a heater disposed on a line along which the BOG having passed through the first decompressor and the second self-heat exchanger is sent to the generator.

In accordance with another aspect of the present invention, there is provided a method including: 1) performing multistage compression with respect to boil-off gas (BOG) discharged from a storage tank; 2) dividing some of the BOG subjected to multistage compression (hereinafter referred to as 'flow a'), followed by expanding the divided BOG; 3) performing heat exchange with respect to the other BOG subjected to multistage compression (hereinafter referred to as 'flow b') with the flow a expanded in step 2); 4) performing heat exchange with respect to the flow b subjected to heat exchange with the flow a in step 3) with the BOG discharged from the storage tank in a first self-heat exchanger; and 5) expanding the flow b subjected to heat exchange with the BOG discharged from the storage tank in step 4).

The method may further include: 6) separating the flow b partially reliquefied through expansion in step 5) into liquefied natural gas and gaseous BOG; and 7) sending the liquefied natural gas separated in step 6) to the storage tank and sending the gaseous BOG separated in step 6) to the first self-heat exchanger after joining the gaseous BOG to the BOG discharged from the storage tank.

Some of the BOG subjected to multistage compression in step 1) may be sent to a high-pressure engine.

The flow a subjected to heat exchange with the flow b in step 3) may be sent to a generator.

The flow a subjected to heat exchange with the flow b in step 3) may be sent to a low-pressure engine.

The flow a subjected to heat exchange with the flow b in step 3) may be sent to a generator and a low-pressure engine.

Advantageous Effects

According to embodiments of the present invention, the ship including an engine uses BOG subjected to precooling and having a lower temperature for heat exchange in a self-heat exchanger, thereby improving reliquefaction efficiency, and allows easy maintenance and overhaul by providing one multistage compressor even in a structure wherein the ship includes a low-pressure engine.

BEST MODE

Hereinafter, embodiments of the present invention will be described in detail with reference to the accompanying drawings. A ship including an engine according to the present invention may be applied to various marine and overland systems. It should be understood that the following embodiments can be modified in various ways and do not limit the scope of the present invention.

Figure 3:
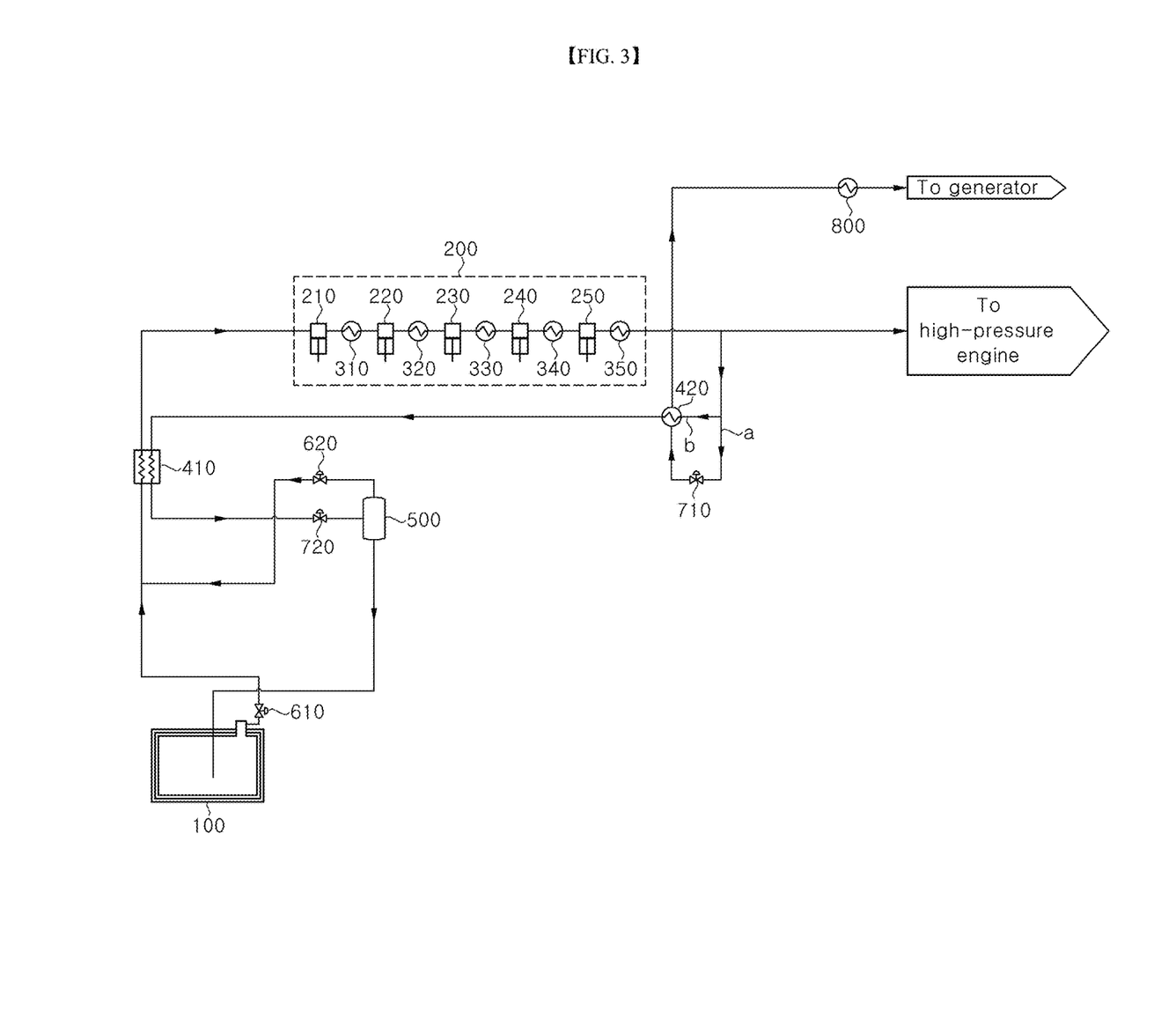
FIG. 3 is a schematic diagram of a partial reliquefaction system applied to a ship including a high-pressure engine according to one embodiment of the present invention.

FIG. 3 is a schematic diagram of a partial reliquefaction system applied to a ship including a high-pressure engine according to one embodiment of the present invention.

In this embodiment, boil-off gas (BOG) discharged from a storage tank 100 will be commonly referred to as BOG and means not only BOG in a gaseous or vapor phase, but also BOG in a gas phase, in a gas/liquid mixed phase, in a liquid phase, and in a supercritical fluid phase.

Referring to FIG. 3, the ship according to this embodiment includes: a first self-heat exchanger 410 performing heat exchange with respect to BOG discharged from the storage tank 100; a multistage compressor 200 compressing the BOG discharged from the storage tank 100 and having passed through the first self-heat exchanger 410 in multiple stages; a first decompressor 710 expanding some of the BOG compressed by the multistage compressor 200; a second self-heat exchanger 420 performing heat exchange with respect to the other BOG compressed by the multistage compressor 200 with the BOG expanded by the first decompressor 710; and a second decompressor 720 expanding the BOG cooled while passing through the second self-heat exchanger 420 and the first self-heat exchanger 410.

In this embodiment, the first self-heat exchanger 410 performs heat exchange between the BOG discharged from the storage tank 100 and the BOG compressed by the multistage compressor 200 and having passed through the second self-heat exchanger 420 (flow b in FIG. 3). Specifically, the first self-heat exchanger 410 cools the BOG compressed by the multistage compressor 200 and having passed through the second self-heat exchanger 420 (flow b in FIG. 3) using the BOG discharged from the storage tank 100 as a refrigerant. In the term "self-heat exchanger", "self-" means that cold BOG is used as a refrigerant for heat exchange with hot BOG.

According to this embodiment, the multistage compressor 200 performs multistage compression with respect to the BOG discharged from the storage tank 100 and having passed through the first self-heat exchanger 410. The multistage compressor 200 includes a plurality of compression cylinders 210, 220, 230, 240, 250 configured to compress BOG, and a plurality of coolers 310, 320, 330, 340, 350 disposed downstream of the plurality of compression cylinders 210, 220, 230, 240, 250, respectively, and cooling the BOG compressed by the compression cylinders 210, 220, 230, 240, 250 and having increased pressure and temperature. In this embodiment, the multistage compressor 200 includes five compression cylinders 210, 220, 230, 240, 250 and five coolers 310, 320, 330, 340, 350, and the BOG is subjected to five stages of compression while passing through the multistage compressor 200. However, it should be understood that this embodiment is provided for illustration only and the present invention is not limited thereto.

According to this embodiment, the first decompressor 710 expands some BOG divided after multistage compression by the multistage compressor 200 (flow a in FIG. 3) and sends the expanded BOG to the second self-heat exchanger 420. The first decompressor 710 may be an expansion device or an expansion valve.

According to this embodiment, the second self-heat exchanger 420 performs heat exchange between some of the BOG subjected to multistage compression by the multistage compressor 200 (flow b in FIG. 3) and the other BOG having passed through the multistage compressor 200 and the first decompressor 710 (flow a in FIG. 3). Specifically, the second self-heat exchanger 420 cools some of the BOG subjected to multistage compression by the multistage compressor 200 (flow b in FIG. 3) using the BOG divided after passing through the multistage compressor 200 and expanded by the first decompressor 710 (flow a in FIG. 3) as a refrigerant.

According to this embodiment, the second decompressor 720 expands the BOG precooled by the second self-heat exchanger 420 and cooled by the first self-heat exchanger 410 after passing through the multistage compressor 200. The second decompressor 720 may be an expansion device or an expansion valve.

The ship according to this embodiment may further include a gas/liquid separator 500 that separates gaseous BOG and liquefied natural gas generated by partial reliquefaction of the BOG through cooling by the second self-heat exchanger 420 and the first self-heat exchanger 410 and expansion by the second decompressor 720. The liquefied natural gas separated by the gas/liquid separator 500 may be sent to the storage tank 100 and the gaseous BOG separated by the gas/liquid separator 500 may be sent to the line along which the BOG is sent from the storage tank 100 to the first self-heat exchanger 410.

The ship according to this embodiment may further include at least one of a first valve 610 blocking the BOG discharged from the storage tank 100 as needed and a heater 800 heating the BOG sent to the generator through the first decompressor 710 and the second self-heat exchanger 420. The first valve 610 may be usually maintained in an open state and may be closed upon maintenance or overhaul of the storage tank 100.

In the structure wherein the ship includes the gas/liquid separator 500, the ship may further include a second valve 620 that controls the flow amount of the gaseous BOG separated by the gas/liquid separator 500 and sent to the first self-heat exchanger 410.

The flow of fluid according to this embodiment will be described hereinafter. It should be noted that temperature and pressure of BOG described hereinafter are approximately theoretical values and can be changed depending upon the temperature of the BOG, the pressure required for the engine, design of the multistage compressor, the speed of the ship, and the like.

BOG generated due to intrusion of external heat inside the storage tank 100 and having a temperature of about −130° C. to −80° C. and atmospheric pressure is discharged from the storage tank 100 and sent to the first self-heat exchanger 410 when the pressure of the BOG becomes a predetermined pressure or more.

The BOG discharged from the storage tank 100 and having a temperature of about −130° C. to −80° C. may be mixed with BOG separated by the gas/liquid separator 500 and having a temperature of about −160° C. to −110° C. and atmospheric pressure, and then sent to the first self-heat exchanger 410 in a state that the BOG has a temperature of about −140° C. to −100° C. and atmospheric pressure.

The BOG sent from the storage tank 100 to the first self-heat exchanger 410 can have a temperature of about −90° C. to 40° C. and atmospheric pressure through heat exchange with BOG having passed through the multistage compressor 200 and the second self-heat exchanger 420 and having a temperature of about −50° C. to 30° C. and a pressure of about 150 to 400 bar (flow b in FIG. 3).

The BOG discharged from the storage tank 100 and having passed through the first self-heat exchanger 410 is subjected to multistage compression by the multistage compressor 200 to have a critical pressure or more.

Figure 5:
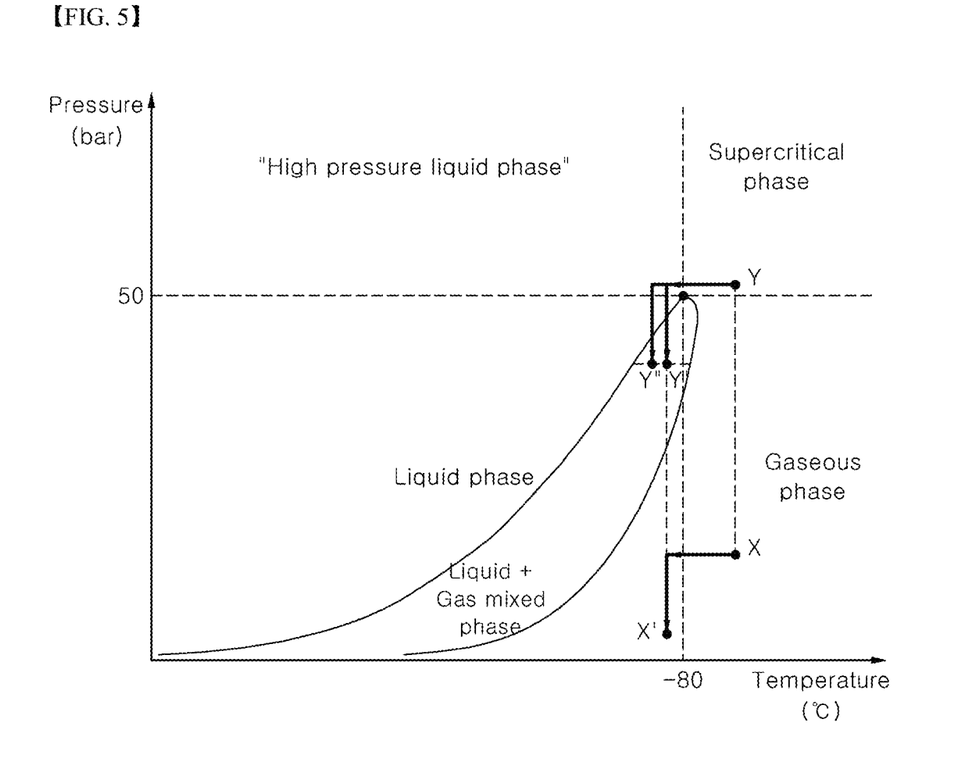
FIG. 5 is a graph depicting a phase transformation curve of methane depending upon temperature and pressure.

FIG. 5 is a graph depicting a phase transformation curve of methane depending upon temperature and pressure. Referring to FIG. 7, methane has a supercritical fluid phase under conditions of about −80° C. or more and a pressure of about 50 bar or more. That is, methane has a critical point at −80° and 50 bar. The supercritical fluid phase is a third phase different from a liquid phase or a gas phase. Here, the critical point of methane can be changed depending upon the amount of nitrogen contained in boil-off gas.

On the other hand, although a fluid having a temperature less than a critical temperature at a critical pressure or more can have a phase different from a general liquid and similar to a supercritical fluid having a high density, and thus can be generally referred to as the supercritical fluid, the phase of boil-off gas having a critical pressure or more and a critical temperature or less will be referred to as "high-pressure liquid phase" hereinafter.

Referring to FIG. 5, it can be seen that, although the gas phase of natural gas having a relatively low pressure (X in FIG. 5) is kept even after reduction in temperature and pressure (X' in FIG. 5), the natural gas can become a gas/liquid mixed phase (Y' in FIG. 5) due to partial liquefaction even upon reduction in temperature and pressure after the pressure of the natural gas is raised (Y in FIG. 5). That is, it can be seen that liquefaction efficiency can further increase with increasing pressure of the natural gas before the natural gas passes through the self-heat exchangers 410, 420 and theoretically 100% liquefaction can also be achieved if the pressure can be sufficiently raised.

Accordingly, the multistage compressor 200 according to this embodiment compresses BOG to the critical pressure or more so as to reliquefy the BOG.

According to this embodiment, since some of the BOG having passed through the multistage compressor 200 is used as fuel of a high-pressure engine, the BOG is compressed by the multistage compressor 200 to have a pressure required for the high-pressure engine. When the high-pressure engine is an ME-GI engine, the BOG having passed through the multistage compressor 200 has a temperature of about 40° C. to 50° C. and a pressure of about 150 to 400 bar.

Among the BOG compressed to the critical pressure or more through multistage compression by the multistage compressor 200, some BOG is used as fuel of the high-pressure engine and the other BOG is divided into two flows.

One flow of the BOG compressed by the multistage compressor 200 and not sent to the engine (flow a in FIG. 3) is expanded by the first decompressor 710 and then sent to the second self-heat exchanger 420, and the other flow of the BOG (flow b in FIG. 3) is directly sent to the second self-heat exchanger 420 and subjected to heat exchange with the BOG expanded by the first decompressor 710 (flow a in FIG. 3). That is, before the BOG compressed by the multistage compressor 200 is sent to the first self-heat exchanger 410, the BOG compressed by the multistage compressor 200 (flow b in FIG. 3) is precooled by the second self-heat exchanger 420 using the BOG expanded by the first decompressor 710 (flow a in FIG. 3) as a refrigerant, thereby improving reliquefaction efficiency.

Since the BOG expanded by the first decompressor 710 is sent to the generator, the BOG is expanded to a pressure required for the generator by the first decompressor 710 and the BOG having passed through the first decompressor 710 may have a temperature of about −60° C. to 20° C. and a pressure of about 6 to 10 bar.

According to this embodiment, the BOG discharged from the storage tank 100 is generally used in three ways. That is, the BOG discharged from the storage tank 100 is used as fuel for the engine after being compressed to the critical pressure or more, sent to a generator after being compressed to a relatively low pressure less than or equal to the critical pressure, or reliquefied and returned to the storage tank 100 when remaining after fulfilling the amount of BOG required for the engine and the generator.

According to this embodiment, the BOG compressed to the critical pressure or more by the multistage compressor 200 (flow b in FIG. 3) is primarily precooled through heat exchange using the BOG expanded by the first decompressor 710 (flow a in FIG. 3) as a refrigerant, based on the fact that the BOG to be sent to the generator is decreased not only in pressure and but also in temperature upon expansion by the first decompressor 710.

Referring to FIG. 5, it can be seen that reliquefaction efficiency can be further improved by self-heat exchange with respect to the BOG having a lower temperature through the precooling process (Y" in FIG. 5). The ship according to this embodiment sends the BOG to the first self-heat exchanger 410 after further reducing the temperature of the BOG through the second self-heat exchanger 420, thereby improving reliquefaction efficiency, and performs precooling of the BOG through self-heat exchange using the BOG as a refrigerant instead of precooling the BOG using a separate refrigerant, thereby providing economic feasibility.

Some BOG compressed by the multistage compressor 200 and having passed through the first decompressor 710 (flow a in FIG. 3) is sent to the generator after heat exchange in the second self-heat exchanger 420. The generator requires a pressure of about 6 to 10 bar, and the BOG sent to the generator after having passed through the first decompressor 710 and the second self-heat exchanger 420 may be heated to a temperature, which is required for the generator, by the heater 800 disposed upstream of the generator.

The BOG having passed through the first decompressor 710 and the second self-heat exchanger 420 may have a temperature of about −30° C. to 40° C. and a pressure of about 6 to 10 bar, and the BOG having passed through the heater 800 may have a gas phase having a temperature of about 40° C. to 50° C. and a pressure of about 6 to 10 bar. In addition, the BOG having passed through the first decompressor 710 may have a gas phase or a gas/liquid mixed phase, and may become a gas phase through heat exchange in the second self-heat exchanger 420.

Some BOG compressed by the multistage compressor 200 and directly sent to the second self-heat exchanger 420 (flow b in FIG. 3) is precooled to a temperature of about −50° C. to 30° C. and a pressure of about 150 to 400 bar by the second self-heat exchanger 420 and is then sent to the first self-heat exchanger 410. Since the pressure of the BOG having passed through the multistage compressor 200 and the second self-heat exchanger 420 is about 150 to 400 bar as required for the high-pressure engine according to this embodiment, the pressure of the BOG having passed through the multistage compressor 200 and the second self-heat exchanger 420 can be changed depending upon the pressure required for the engine.

The BOG precooled by the second self-heat exchanger 420 and then sent to the first self-heat exchanger 410 has a temperature of about −130° C. to −90° C. and a pressure of about 150 to 400 bar through heat exchange with the BOG discharged from the storage tank 100.

The BOG subjected to compression by the multistage compressor 200, precooling by the second self-heat exchanger 420 and cooling by the first self-heat exchanger 410 is partially reliquefied through expansion by the second decompressor 720. The BOG having passed through the second decompressor 720 may have a temperature of about −140° C. to −110° C. and a pressure of about 2 to 10 bar.

The BOG partially reliquefied in the second decompressor 720 may be directly sent in a gas/liquid mixed phase to the storage tank 100, or may be sent to the gas/liquid separator 500, by which the gas/liquid mixed phase is separated into a liquid phase and a gas phase.

When the partially reliquefied BOG is sent to the gas/liquid separator 500, the liquefied natural gas separated by the gas/liquid separator 500 and having a temperature of about −163° C. and atmospheric pressure is sent to the storage tank 100, and the gaseous BOG separated by the gas/liquid separator 500 and having a temperature of about −160° C. to −110° C. and atmospheric pressure is sent together with the BOG discharged from the storage tank 100 to the first self-heat exchanger 410. The flow amount of the BOG separated by the gas/liquid separator 500 and sent to the first self-heat exchanger 410 may be controlled by the second valve 620.

Figure 4:
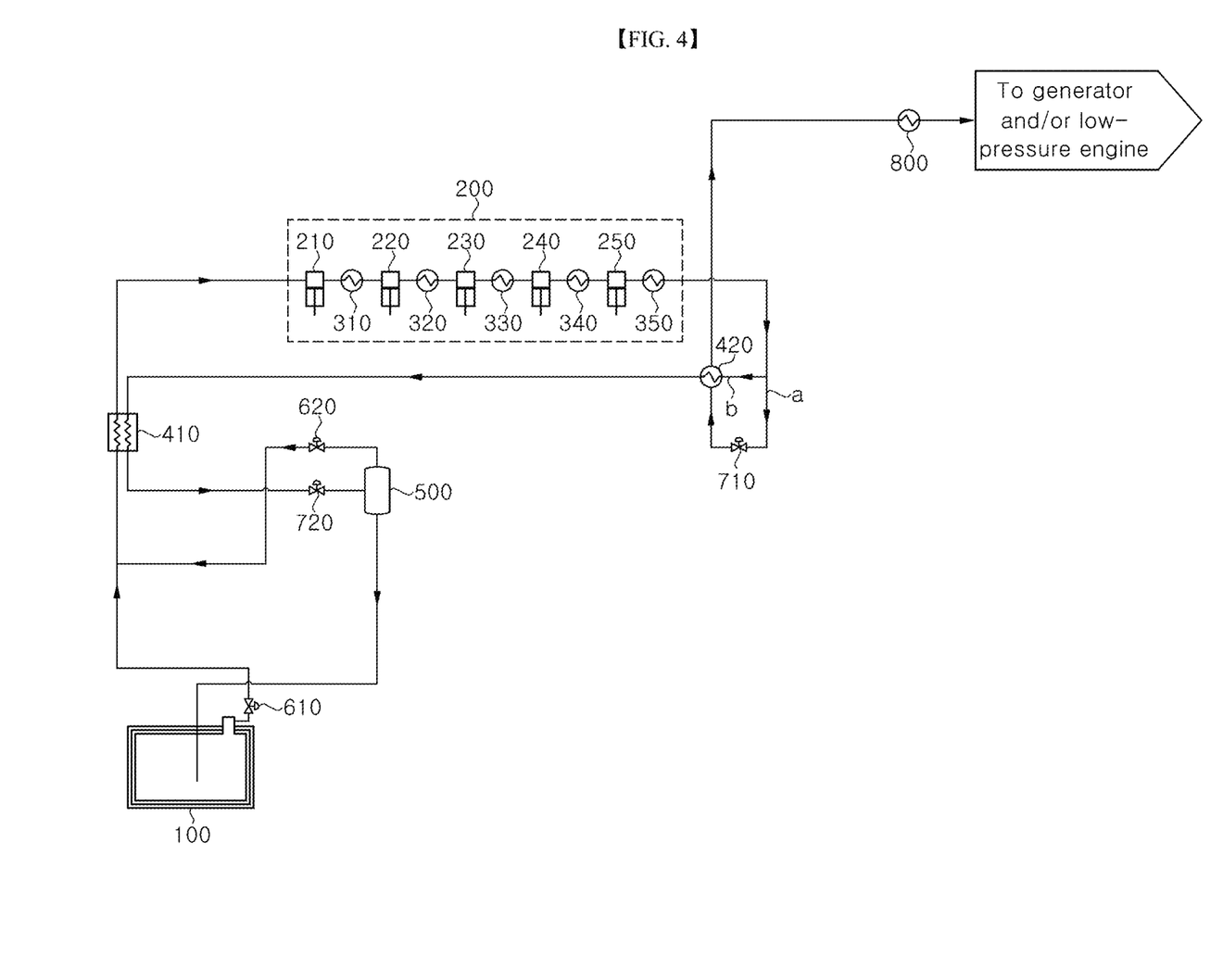
FIG. 4 is a schematic diagram of the partial reliquefaction system applied to a ship including a low-pressure engine according to the embodiment of the present invention.

FIG. 4 is a schematic diagram of the partial reliquefaction system applied to a ship including a low-pressure engine according to the embodiment of the present invention.

The partial reliquefaction system applied to the ship including a low-pressure engine shown in FIG. 4 is different from the partial reliquefaction system applied to the ship including a high-pressure engine shown in FIG. 3 in that some BOG subjected to multistage compression by the multistage compressor 200 is sent to the generator and/or the engine after having passed through the first decompressor 710 and the second self-heat exchanger 420, and the following description will focus on different configuration of the partial reliquefaction system. Descriptions of details of the same components as those of the ship including the high-pressure engine described above will be omitted.

Differentiation between the high-pressure engine included in the ship to which the partial reliquefaction system shown in FIG. 3 is applied and the low-pressure engine included in the ship to which the partial reliquefaction system shown in FIG. 4 is applied is based on use of natural gas having a critical pressure or more as fuel by the engine. That is, an engine using natural gas having a critical pressure or more as fuel is referred to as the high-pressure engine, and an engine using natural gas having a pressure of less than the critical pressure as fuel is referred to as the low-pressure engine.

Referring to FIG. 4, as in the ship including the high-pressure engine shown in FIG. 3, the ship according to this embodiment includes a first self-heat exchanger 410, a multistage compressor 200, a first decompressor 710, a second self-heat exchanger 420, and a second decompressor 720.

As in the ship including the high-pressure engine shown in FIG. 3, the first self-heat exchanger 410 according to this embodiment performs heat exchange between the BOG discharged from the storage tank 100 and the BOG compressed by the multistage compressor 200 and having passed through the second self-heat exchanger 420 (flow b in FIG. 4). Specifically, the first self-heat exchanger 410 cools the BOG compressed by the multistage compressor 200 and having passed through the second self-heat exchanger 420 (flow b in FIG. 4) using the BOG discharged from the storage tank 100 as a refrigerant.

As in the ship including the high-pressure engine shown in FIG. 3, the multistage compressor 200 according to this embodiment performs multistage compression with respect to the BOG discharged from the storage tank 100 and having passed through the first self-heat exchanger 410. As in the ship including the high-pressure engine shown in FIG. 3, the multistage compressor 200 according to this embodiment may include a plurality of compression cylinders 210, 220, 230, 240, 250 and a plurality of coolers 310, 320, 330, 340, 350.

As in the ship including the high-pressure engine shown in FIG. 3, the first decompressor 710 according to this embodiment expands some BOG divided after multistage compression by the multistage compressor 200 (flow a in FIG. 4) and sends the expanded BOG to the second self-heat exchanger 420. The first decompressor 710 may be an expansion device or an expansion valve.

As in the ship including the high-pressure engine shown in FIG. 3, the second self-heat exchanger 420 performs heat exchange between some of the BOG subjected to multistage compression by the multistage compressor 200 (flow b in FIG. 4) and the other BOG having passed through the multistage compressor 200 and the first decompressor 710 (flow a in FIG. 4). Specifically, the second self-heat exchanger 420 cools some of the BOG subjected to multistage compression by the multistage compressor 200 (flow b in FIG. 4) using the BOG divided after passing through the multistage compressor 200 and expanded by the first decompressor 710 (flow a in FIG. 4) as a refrigerant As in the ship including the high-pressure engine shown in FIG. 3, the second decompressor 720 expands the BOG precooled by the second self-heat exchanger 420 and cooled by the first self-heat exchanger 410 after passing through the multistage compressor 200. The second decompressor 720 may be an expansion device or an expansion valve.

As in the ship including the high-pressure engine shown in FIG. 3, the ship according to this embodiment may further include a gas/liquid separator 500 disposed downstream of the second decompressor 720. The liquefied natural gas separated by the gas/liquid separator 500 may be sent to the storage tank 100 and the gaseous BOG separated by the gas/liquid separator 500 may be sent to the line along which the BOG is sent from the storage tank 100 to the first self-heat exchanger 410.

As in the ship including the high-pressure engine shown in FIG. 3, the ship according to this embodiment may further include at least one of a first valve 610 blocking the BOG discharged from the storage tank 100 as needed and a heater 800 heating the BOG sent to the generator through the first decompressor 710 and the second self-heat exchanger 420.

Further, as in the ship including the high-pressure engine shown in FIG. 3, in the structure wherein the ship includes the gas/liquid separator 500, the ship may further include a second valve 620 that controls the flow amount of the gaseous BOG separated by the gas/liquid separator 500 and sent to the first self-heat exchanger 410.

The flow of fluid according to this embodiment will be described hereinafter.

BOG generated due to intrusion of external heat inside the storage tank 100 and having a temperature of about −130° C. to −80° C. and atmospheric pressure is discharged from the storage tank 100 and sent to the first self-heat exchanger 410 when the pressure of the BOG becomes a predetermined pressure or more, as in the ship including the high-pressure engine shown in FIG. 3.

The BOG discharged from the storage tank 100 and having a temperature of about −130° C. to −80° C. may be mixed with BOG separated by the gas/liquid separator 500 and having a temperature of about −160° C. to −110° C. and atmospheric pressure, and then sent to the first self-heat exchanger 410 in a state that the BOG has a temperature of about −140° C. to −100° C. and atmospheric pressure, as in the ship including the high-pressure engine shown in FIG. 3.

The BOG sent from the storage tank 100 to the first self-heat exchanger 410 can have a temperature of about −90° C. to 40° C. and atmospheric pressure through heat exchange with BOG having passed through the multistage compressor 200 and the second self-heat exchanger 420 and having a temperature of about −50° C. to 30° C. and a pressure of 150 to 300 bar (flow b in FIG. 4).

The BOG discharged from the storage tank 100 and having passed through the first self-heat exchanger 410 is subjected to multistage compression by the multistage compressor 200 to have a critical pressure or more, as in the ship including the high-pressure engine shown in FIG. 3.

According to this embodiment, since some of the BOG having passed through the multistage compressor 200 is not directly sent to the engine, there is no need for the multistage compressor 200 to compress the BOG to a pressure required for the engine, unlike the ship including the high-pressure engine shown in FIG. 3. However, for reliquefaction efficiency, the BOG is preferably compressed to the critical pressure or more, more preferably 100 bar or more, by the multistage compressor 200. The BOG having passed through the multistage compressor 200 may have a temperature of about 40° C. to 50° C. and a pressure of about 100 to 300 bar.

Unlike the ship shown in FIG. 2, the ship including the low-pressure engine according to this embodiment includes a single multistage compressor, thereby enabling easy maintenance and overhaul.

All of the BOG compressed to the critical pressure or more through multistage compression by the multistage compressor 200 is divided into two flows and sent to the first decompressor 710 or the second self-heat exchanger 420, unlike the ship including the high-pressure engine shown in FIG. 3.

As in the ship including the high-pressure engine shown in FIG. 3, one flow of the BOG compressed by the multistage compressor 200 (flow a in FIG. 4) is expanded by the first decompressor 710 and then sent to the second self-heat exchanger 420, and the other flow of the BOG (flow b in FIG. 4) is directly sent to the second self-heat exchanger 420 and subjected to heat exchange with the BOG expanded by the first decompressor 710 (flow a in FIG. 4). That is, before the BOG compressed by the multistage compressor 200 is sent to the first self-heat exchanger 410, the BOG compressed by the multistage compressor 200 (flow b in FIG. 4) is precooled by the second self-heat exchanger 420 using the BOG expanded by the first decompressor 710 (flow a in FIG. 4) as a refrigerant, thereby improving reliquefaction efficiency.

Since the BOG expanded by the first decompressor 710 is sent to the low-pressure engine and/or the generator, the BOG is expanded to a pressure required for the low-pressure engine and/or the generator by the first decompressor 710 and the BOG having passed through the first decompressor 710 may have a temperature of about −60° C. to 20° C. and a pressure of about 6 to 10 bar. Here, when the low-pressure engine is a gas turbine, the BOG expanded by the first decompressor 710 may have a pressure of about 55 bar.

Some BOG compressed by the multistage compressor 200 and having passed through the first decompressor 710 (flow a in FIG. 4) is sent not only to the generator but also to the engine after heat exchange in the second self-heat exchanger 420, unlike the ship including the high-pressure engine shown in FIG. 3.

The BOG sent to the generator after having passed through the first decompressor 710 and the second self-heat exchanger 420 may be controlled to a temperature by the heater 800. The BOG having passed through the first decompressor 710 and the second self-heat exchanger 420 may have a temperature of about −30° C. to 40° C. and a pressure of about 6 to 20 bar, and the BOG having passed through the heater 800 may have a temperature of about 40° C. to 50° C. and a pressure of about 6 to 20 bar. Here, when the low-pressure engine is a gas turbine, the BOG having passed through the heater 800 may have a pressure of about 55 bar.

The generator requires a pressure of about 6 to 10 bar and the low-pressure engine requires a pressure of about 6 to 20 bar. The low-pressure engine may be a DF engine, an X-DF engine, or a gas turbine. Here, when the low-pressure engine is a gas turbine, the gas turbine requires a pressure of about 55 bar.

As in the ship including the high-pressure engine shown in FIG. 3, the BOG having passed through the first decompressor 710 may have a gas phase or a gas/liquid mixed phase, and may become a gas phase through heat exchange in the second self-heat exchanger 420.

Some BOG compressed by the multistage compressor 200 and directly sent to the second self-heat exchanger 420 (flow b in FIG. 4) is precooled to a temperature of about −50° C.

to 30° C. and a pressure of about 100 to 300 bar by the second self-heat exchanger 420 and is then sent to the first self-heat exchanger 410.

As described above, the condition that the pressure of the BOG having passed through the multistage compressor 200 and the second self-heat exchanger 420 is about 100 to 300 bar is determined to improve reliquefaction efficiency in the second self-heat exchanger 420 by compressing the BOG to the critical pressure or more in the multistage compressor 200. Thus, the pressure of the BOG having passed through the multistage compressor 200 and the second self-heat exchanger 420 can be changed depending upon operation conditions.

The BOG precooled by the second self-heat exchanger 420 and then sent to the first self-heat exchanger 410 has a temperature of about −130° C. to −90° C. and a pressure of about 100 to 300 bar through heat exchange with the BOG discharged from the storage tank 100.

As in the ship including the high-pressure engine shown in FIG. 3, the BOG subjected to compression by the multistage compressor 200, precooling by the second self-heat exchanger 420 and cooling by the first self-heat exchanger 410 is partially reliquefied through expansion by the second decompressor 720. The BOG having passed through the second decompressor 720 may have a temperature of about −140° C. to −110° C. and a pressure of about 2 to 10 bar.

The BOG partially reliquefied in the second decompressor 720 may be directly sent in a gas/liquid mixed phase to the storage tank 100, or may be sent to the gas/liquid separator 500, by which the gas/liquid mixed phase is separated into a liquid phase and a gas phase, as in the ship including the high-pressure engine shown in FIG. 3.

As in the ship including the high-pressure engine shown in FIG. 3, when the partially reliquefied BOG is sent to the gas/liquid separator 500, the liquefied natural gas separated by the gas/liquid separator 500 and having a temperature of about −163° C. and atmospheric pressure is sent to the storage tank 100, and the gaseous BOG separated by the gas/liquid separator 500 and having a temperature of about −160° C. to −110° C. and atmospheric pressure is sent together with the BOG discharged from the storage tank 100 to the first self-heat exchanger 410. The flow amount of the BOG separated by the gas/liquid separator 500 and sent to the first self-heat exchanger 410 may be controlled by the second valve 620.

It will be apparent to those skilled in the art that the present invention is not limited to the embodiments described above and various modifications, changes, alterations, and equivalent embodiments can be made art without departing from the spirit and scope of the present invention.

The invention claimed is:

1. A ship comprising an engine, the ship further comprising:
   a first self-heat exchanger configured to perform heat exchange with respect to boil-off gas (BOG) discharged from a storage tank;
   a multistage compressor configured to compress the BOG discharged from the storage tank and having passed through the first self-heat exchanger in multiple stages;
   a first decompressor configured to expand some of the BOG compressed by the multistage compressor;
   a second self-heat exchanger configured to perform heat exchange with respect to the other BOG compressed by the multistage compressor with the BOG expanded by the first decompressor; and
   a second decompressor configured to expand the BOG precooled by the second self-heat exchanger and cooled by the first self-heat exchanger,
   wherein the first self-heat exchanger configured to cool the BOG compressed by the multistage compressor and having passed through the second self-heat exchanger using the BOG discharged from the storage tank.

2. The ship comprising an engine according to claim 1, wherein the BOG having passed through the second decompressor and having a gas/liquid mixed phase is sent to the storage tank.

3. The ship comprising an engine according to claim 1, further comprising:
   a gas/liquid separator disposed downstream of the second decompressor and configured to separate liquefied natural gas generated through reliquefaction of the BOG and gaseous BOG from each other,
   wherein the liquefied natural gas separated by the gas/liquid separator is sent to the storage tank and the gaseous BOG separated by the gas/liquid separator is sent to the first self-heat exchanger.

4. The ship comprising an engine according to claim 1, wherein some of the BOG having passed through the multistage compressor is sent to an engine configured to use natural gas at a pressure of about 150 to 400 bar as fuel.

5. The ship comprising an engine according to claim 4, wherein the engine is an ME-GI engine.

6. The ship comprising an engine according to claim 1, wherein the BOG having passed through the first decompressor and the second self-heat exchanger is sent to at least one of a generator and an engine configured to use natural gas at a pressure of about 6 to 20 bar as fuel.

7. The ship comprising an engine according to claim 6, wherein the engine is at least one of a DF engine, an X-DF engine and a gas turbine.

8. The ship comprising an engine according to claim 6, wherein the generator is configured to use natural gas at a pressure of about 6 to 10 bar as fuel.

9. The ship comprising an engine according to claim 1, wherein the multistage compressor is configured to compress the BOG to a critical pressure or more.

10. The ship comprising an engine according to claim 9, wherein the multistage compressor is configured to compress the BOG to a pressure of about 100 bar or more.

11. The ship comprising an engine according to claim 3, further comprising:
    a valve configured to control a flow amount of the gaseous BOG separated by the gas/liquid separator and sent to the first self-heat exchanger.

12. The ship comprising an engine according to claim 6, further comprising:
    a heater disposed on a line along which the BOG having passed through the first decompressor and the second self-heat exchanger is sent to the generator.

13. A method comprising:
    1) performing multistage compression with respect to boil-off gas (BOG) discharged from a storage tank;
    2) dividing some of the BOG subjected to multistage compression, which is referred to as a first flow, followed by expanding the divided BOG;
    3) performing heat exchange with respect to the other BOG subjected to multistage compression, which is referred to as a second flow, with the first flow expanded in step 2);
    4) performing heat exchange with respect to the second flow b-subjected to heat exchange with the first flow in step 3) with the BOG discharged from the storage tank in a first self-heat exchanger; and 5) expanding the second flow subjected to heat exchange with the BOG discharged from the storage tank in step 4).

14. The method according to claim 13, further comprising:

6) separating the BOG partially reliquefied through expansion in step 5) into liquefied natural gas and gaseous BOG; and 7) sending the liquefied natural gas separated in step 6) to the storage tank and sending the gaseous BOG separated in step 6) to the first self-heat exchanger after joining the gaseous BOG to the BOG discharged from the storage tank.

15. The method according to claim 13, wherein some of the BOG subjected to multistage compression in step 1) is sent to an engine configured to use natural gas at a pressure of about 150 to 400 bar as fuel.

16. The method according to claim 13, wherein the first flow subjected to heat exchange with the second flow in step 3) is sent to a generator.

17. The method according to claim 13, wherein the first flow subjected to heat exchange with the second flow in step 3) is sent to at least one of a generator and an engine configured to use natural gas at a pressure of about 6 to 20 bar as fuel.

18. The method according to claim 13, wherein the first flow subjected to heat exchange with the second flow in step 3) is sent to at least one of a generator and an engine configured to use natural gas at a pressure of about 55 bar as fuel.

* * * * *